(12) United States Patent
Doi et al.

(10) Patent No.: US 9,798,696 B2
(45) Date of Patent: *Oct. 24, 2017

(54) COMPUTER SYSTEM, METHOD, AND PROGRAM

(71) Applicant: INTERNATIONAL BUSINESS MACHINES CORPORATION, Armonk, NY (US)

(72) Inventors: Munehiro Doi, Kanagawa (JP); Hideaki Komatsu, Kanagawa (JP); Kumiko Maeda, Tokyo (JP); Masana Murase, Tokyo (JP); Takeo Yoshizawa, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 460 days.

This patent is subject to a terminal disclaimer.

(21) Appl. No.: 13/684,380

(22) Filed: Nov. 23, 2012

(65) Prior Publication Data

US 2013/0080609 A1    Mar. 28, 2013

Related U.S. Application Data

(63) Continuation of application No. 13/695,558, filed as application No. PCT/JP2011/059833 on Apr. 21, 2011.

(30) Foreign Application Priority Data

May 14, 2010   (JP) .................................. 2010112117

(51) Int. Cl.
    *G06F 15/177*    (2006.01)
    *G06F 9/48*      (2006.01)

(52) U.S. Cl.
    CPC ............. *G06F 15/177* (2013.01); *G06F 9/48* (2013.01)

(58) Field of Classification Search
    None
    See application file for complete search history.

(56) References Cited

U.S. PATENT DOCUMENTS

| | | | |
|---|---|---|---|
| 5,867,704 A | 2/1999 | Tanaka et al. | |
| 6,711,607 B1 * | 3/2004 | Goyal | 709/203 |

(Continued)

FOREIGN PATENT DOCUMENTS

| | | | |
|---|---|---|---|
| CN | 1503150 A | 6/2004 | |
| JP | 8292932 A | 11/1996 | |

(Continued)

OTHER PUBLICATIONS

Carney, Don, et al. "Monitoring streams: a new class of data management applications." Proceedings of the 28th international conference on Very Large Data Bases. VLDB Endowment, 2002.*

(Continued)

*Primary Examiner* — Jeffrey Nickerson
*Assistant Examiner* — Sean Concannon
(74) *Attorney, Agent, or Firm* — Tutunjian & Bitetto, P.C.; Jennifer R. Davis

(57) ABSTRACT

Traffic data while the system is in operation is collected for a certain time as a preprocess. Typical patterns are extracted from the collected traffic data. Next, stream programs are created for the individual typical patterns and stored for the future reference. Next, the IDs of alternative tasks for transition among different stream programs are stored. In actual system operation, the system measures traffic data regularly or at any time, compares the resultant patterns with the typical patterns, and selects a stream program corresponding to the closest typical pattern as the next phase. Program shutdown time when shifting from the stream program in the present phase to the next phase can be reduced by gradually shifting empty tasks in the present (Continued)

phase to the next stream program as alternative tasks in consideration of the cost of switching between tasks, the cost of transferring data among resources, and so on.

15 Claims, 17 Drawing Sheets

(56) References Cited

U.S. PATENT DOCUMENTS

| | | | |
|---|---|---|---|
| 7,684,320 B1* | 3/2010 | Nucci | H04L 43/022 370/229 |
| 8,213,453 B1* | 7/2012 | Voruganti | H04L 47/32 370/235 |
| 2006/0029097 A1* | 2/2006 | McGee et al. | 370/468 |
| 2007/0011374 A1 | 1/2007 | Kumar et al. | |
| 2007/0094561 A1* | 4/2007 | Udell et al. | 714/738 |
| 2007/0211280 A1* | 9/2007 | Bansal et al. | 358/1.15 |
| 2007/0233870 A1* | 10/2007 | Goto et al. | 709/226 |
| 2007/0294408 A1* | 12/2007 | Jackson | 709/226 |
| 2009/0106730 A1* | 4/2009 | Mockford | 717/101 |
| 2009/0192981 A1* | 7/2009 | Papaemmanouil et al. | 707/2 |
| 2010/0030544 A1* | 2/2010 | Gopalan et al. | 703/13 |
| 2010/0296402 A1* | 11/2010 | Fraccalvieri et al. | 370/252 |

FOREIGN PATENT DOCUMENTS

| | | |
|---|---|---|
| JP | 2004171234 A | 6/2004 |
| JP | 2005174201 A | 6/2005 |
| JP | 2007048315 A | 2/2007 |
| JP | 2008191737 A | 8/2008 |
| JP | 2009271308 A | 11/2009 |
| TW | 200719160 | 5/2007 |
| TW | 200817887 | 4/2008 |
| TW | 200925909 | 6/2009 |
| WO | WO2007079095 | 7/2007 |
| WO | WO2010047166 | 4/2010 |

OTHER PUBLICATIONS

Zhang, Yanyong, et al. "An integrated approach to parallel scheduling using gang-scheduling, backfilling, and migration." Parallel and Distributed Systems, IEEE Transactions on 14.3 (2003): 236-247.*
Abadi, Daniel J., et al. "The Design of the Borealis Stream Processing Engine." CIDR. vol. 5. 2005.*
Anjali, Tricha, Caterina Scoglio, and George Uhl. "A new scheme for traffic estimation and resource allocation for bandwidth brokers." Computer networks 41.6 (2003): 761-777.*
Chu, Wesley W., Leslie J. Holloway, and K. Efe. "Task allocation in distributed data processing." Computer 11 (1980): 57-69.*
Ramamritham, Krithi. "Allocation and scheduling of complex periodic tasks." Distributed Computing Systems, 1990. Proceedings., 10th International Conference on. IEEE, 1990.*
Chen, Jiawen, et al. "A reconfigurable architecture for load-balanced rendering." Proceedings of the ACM SIGGRAPH/ EUROGRAPHICS conference on Graphics hardware. ACM, 2005.*
</http://groups.csail.mit.edu/cag/streamit/> "Stream It" Dec. 2014. 1 Page.
</http://groups.csail.mit.edu/cag/streamit/papers/streamit-cookbook.pdf/> "StreamIt Cookbook" Sep. 2006. pp. 1-27.
Gedik, B., et al. "Spade: The System S Declarative Stream Processing Engine" SIGMOD '08. Jun. 2008. pp. 1123-1134.

* cited by examiner

FIG. 3

| UDOP | KERNEL | EXECUTION PATTERN | PITCH | RESOURCE |
|---|---|---|---|---|
| A | A1 | loop (1, A_x86) |  | x86 x 1 |
| B | B1 | loop (1, B_x86) |  | x86 x 1 |
| B | B2 | loop (1, B_cu) |  | cuda x 1 |
| C | C1 | loop (1, C_x86) |  | x86 x 1 |
| D | D1 | loop (3, D_x86) |  | x86 x 1 |
| D | D2 | parellel (3, D_x86) |  | x86 x 3 |
| D | D3 | loop (3, D_cu) |  | cuda x 1 |
| D | D4 | parellel (3, D_cu) |  | cuda x 3 |
| D | D5 | splitjoin(<br>loop (1, D_x86),<br>loop (2, D_cu)) |  | x86 x 1,<br>cuda x 1 |

TOPOLOGY OF
CALCULATION RESOURCE

FIG. 20
PHASE α
(1)
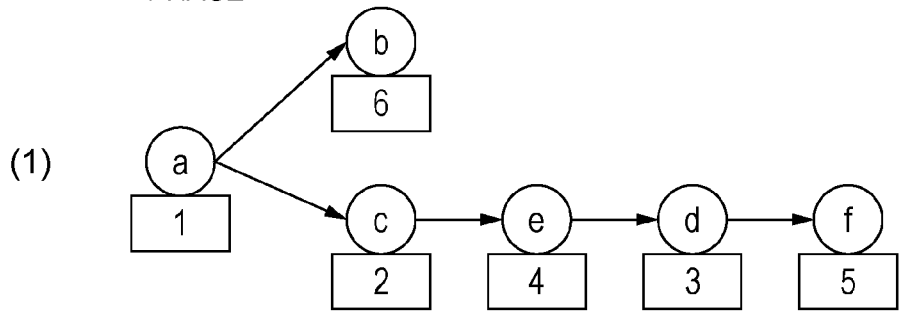
DURING EXECUTION OF
ALTERNATIVE TASKS
(2)
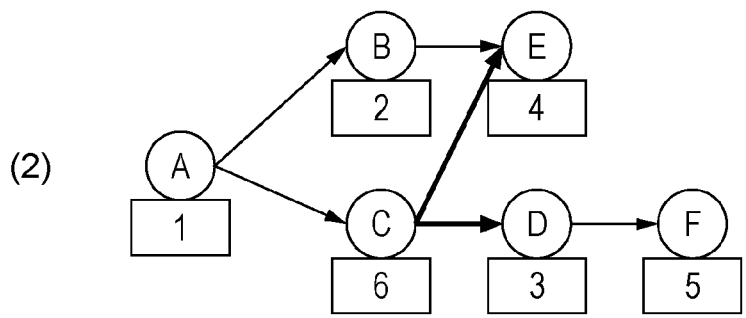
PHASE β
(3)
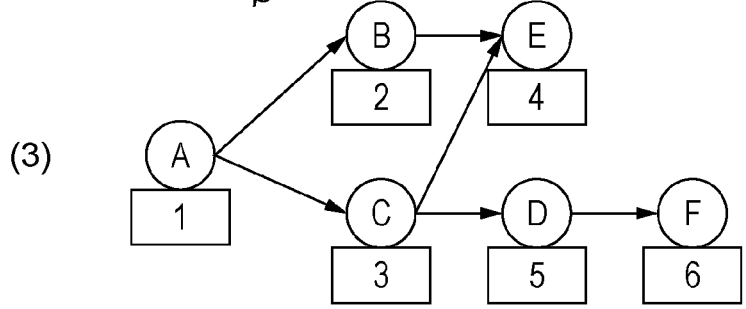

FIG. 21

EXECUTION-TASKS TRANSITION CYCLE
OF ALTERNATIVE METHOD

| | | | | | | | | |
|---|---|---|---|---|---|---|---|---|
| RESOURCE 1 | a | A | A | A | A | A | A | A | A |
| RESOURCE 2 | c | c | B | B | B | B | B | B | B |
| RESOURCE 6 | b | b | C | C | C | C | F | F | F |
| RESOURCE 4 | e | e | e | E | E | E | E | E | E |
| RESOURCE 3 | d | d | d | d | D | D | C | C | C |
| RESOURCE 5 | f | f | f | f | f | F | D | D | D |

COMPUTER SYSTEM, METHOD, AND PROGRAM

RELATED APPLICATION INFORMATION

This application is a Continuation application of co-pending U.S. patent application Ser. No. 13/695,558 filed on Oct. 31, 2012, incorporated herein by reference in its entirety.

TECHNICAL FIELD

The present invention relates to a technique for dynamically assigning resources in a computer system depending on the state of network traffic and so on, and more specifically, it relates to a technique for switching the configuration of resource assignment.

BACKGROUND ART

Hitherto, dynamic change of resource assignment has been performed to optimize computer processing depending on the operating state of active application programs and the state of network traffic. For that purpose, the following techniques are proposed.

Japanese Unexamined Patent Application Publication Nos. 2005-174201 and 2007-48315 disclose a resource assignment change system that includes a resource list including a server, a network, and a storage; an application list showing the components of applications operating on the resources; an resource-application assignment list; a performance information measurement item template that generates performance information measurement items from the above configuration information; a performance measurement engine that measures the performance information measurement items; and means for generating resource assignment change rules used for changing resource assignment from the configuration information, wherein resource assignment is changed in accordance with the generated resource assignment change rules and the configuration information. The resource assignment change rules include threshold values of measured performance indices.

In order to provide an application execution system capable of stable system operation without being affected by server performance and line quality and without an additional space, Japanese Unexamined Patent Application Publication No. 2008-191737 discloses an application execution system in which a client terminal and an application execution unit are connected to a first network, and the application execution unit and a proxy server are connected to a second network, wherein the application execution unit includes an execution section that executes an application, and a switching section that operates independently of the execution section to transfer a received execution request to the execution section or the proxy server depending on the state of the execution section. The proxy server executes an alternative application in response to the execution request.

Although these prior arts disclose techniques for changing system configuration by changing performance on the server and improving the processing capacity depending on the result, they have a problem in that the system stops when the system configuration is changed.

Services based on cloud computing that many companies have recently introduced adopt the concept of service level agreement (SLA); if the system stop time is long, the service provider suffers a loss.

However, the related arts suggest no particular solution for reducing the system stop time during switching the system configuration.

CITATION LIST

Patent Literature

[PTL 1] Japanese Unexamined Patent Application Publication No. 2005-174201
[PTL 2] Japanese Unexamined Patent Application Publication No. 2007-48315
[PTL 3] Japanese Unexamined Patent Application Publication No. 2008-191737

SUMMARY OF INVENTION

Accordingly, it is an object of the present invention to reduce a system stop time due to a change of system configuration in a computer-controlled dynamic resource assignment system depending on the circumstances.

The system in accordance with the present invention first collects traffic data while the system is in operation for a certain time as a preprocess and extracts typical patterns from the collected traffic data.

The system then generates stream programs for the individual typical patterns and stores for the future reference using, for example, a technique described in Japanese Patent Application No. 2009-271308 filed by the applicant, although not limited thereto.

The system in accordance with the present invention then stores the IDs of alternative tasks for transition among different stream programs.

Then, in actual system operation, the system in accordance with the present invention measures traffic data regularly or at any time, compares the resultant patterns with the typical patterns, and selects a stream program corresponding to the closest typical pattern as the next phase.

According to the present invention, program shutdown time when shifting from the stream program in the present phase to the next phase can be reduced by gradually shifting empty tasks in the present phase to the next stream program as alternative tasks in consideration of the cost of switching between tasks, the cost of transferring data among resources, and so on.

At that time, the alternative tasks are selected by measuring and storing, in advance, the pipeline pitches of related tasks, a related-task switching cost, and a cost including the time for data transmission and reception between the resources in the related phases so that the costs are reduced in consideration of the present phase and the next phase, the transition of resources used, and the transition of tasks executed.

According to the present invention, a computer-controlled dynamic resource assignment system is provided with the advantage of reducing a program stop time when shifting from the original configuration to the next configuration depending on the circumstances by reducing an idle time between processes by selecting alternative tasks from the original configuration to execute an intermediate process.

BRIEF DESCRIPTION OF DRAWINGS

FIG. 3 is a diagram showing an example of a configuration table.

FIG. 20 is a diagram showing an example of phase switching and execution by alternative tasks.

FIG. 21 is a diagram showing an example of an execution-tasks transition cycle by an alternative method.

DESCRIPTION OF EMBODIMENTS

Figure 1:
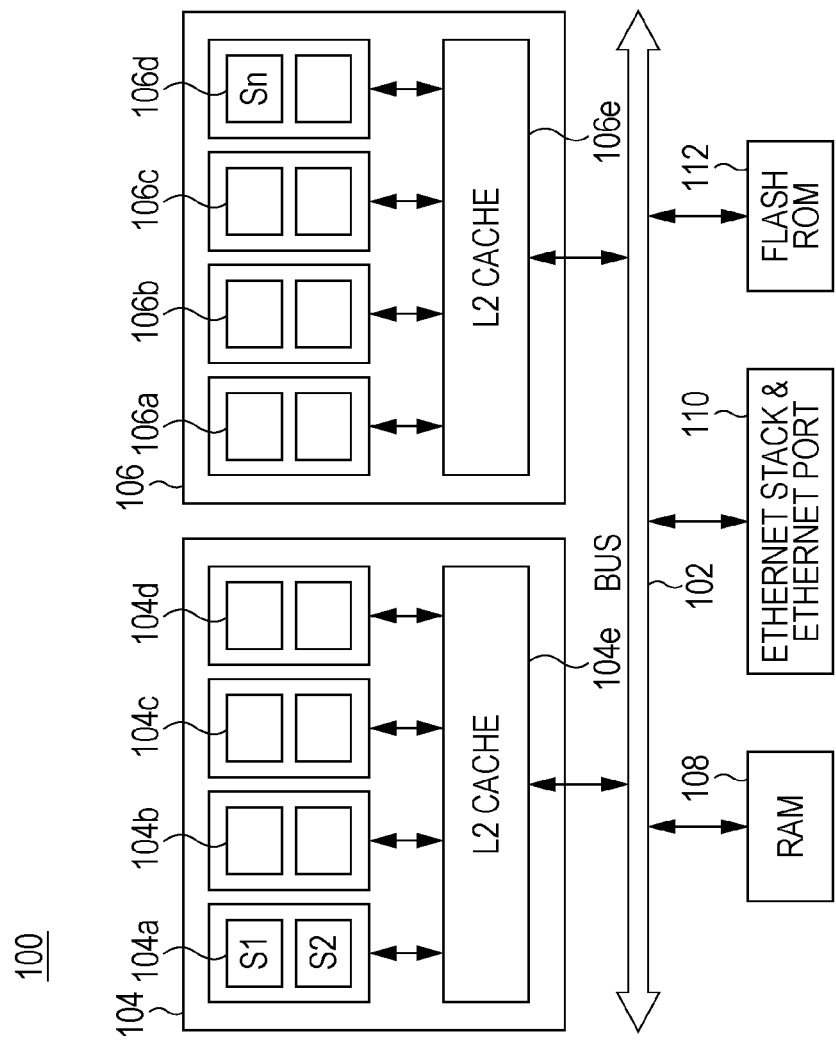
FIG. 1 is a block diagram showing a hardware configuration for carrying out the present invention.

An embodiment of the present invention will be described hereinbelow with reference to the drawings. The same reference numerals denote the same components throughout the drawings unless otherwise specified. It is to be understood that the following description is an embodiment of the present invention and that the invention is not limited to the description of the embodiment.

FIG. 1 is a block diagram showing a hardware configuration for performing the present invention. This embodiment uses a multicore multiprocessor router appliance 100, such as a PRISM; however, the present invention is not limited thereto.

In FIG. 1, a bus 102 is connected to a multicore processor 104, a multicore processor 106, a RAM 108, an Ethernet stack & Ethernet port 110, and a flash ROM 112.

Examples of the multicore processors 104 and 106 include a network processor, such as an Intel® IXP 425 network processor, although not limited thereto. The network processor has the functions of Ethernet® MAC, cipher processing, and so on.

Since the multicore processor 104 and the multicore processor 106 have substantially the same configuration, the multicore processor 104 will be described as a representative. The multicore processor 104 includes a plurality of cores 104a, 104b, 104c, and 104d. The cores 104a, 104b, 104c, and 104d are connected to the bus 102 via an L2 cache 104e.

The individual cores 104a, 104b, 104c, and 104d allow a plurality of threads to run. For example, boxes S1 and S2 shown in the core 104a are independent threads S1 and S2. Since the same applies to the cores 104b, 104c, and 104d, individual descriptions will be omitted.

In this embodiment, as shown in the drawing, a management thread Sn that executes the main functions of the present invention runs on the core 106d of the multicore processor 106.

The RAM 108 is used for the multicore processor 104 and the multicore processor 106 to temporarily hold or read the values of processing results.

Though not shown, the Ethernet stack & Ethernet port 110 connects to another computer system, a network attached storage (NAS), a storage area network (SAN), another router, and so on. The multicore multiprocessor router appliance 100 has the function of communicating data with those devices.

The flash ROM 112 includes a network OS, such as Junos® of Juniper Networks or IOS of Cisco Systsms Inc., and processing modules according to the present invention, to be described later, for making the multicore processor 104 and the multicore processor 106 operate as routers.

Next, processing modules according to the present invention held in the flash ROM 112, the RAM 108, and so on will be described with reference to a functional block diagram in FIG. 2.

Figure 2:
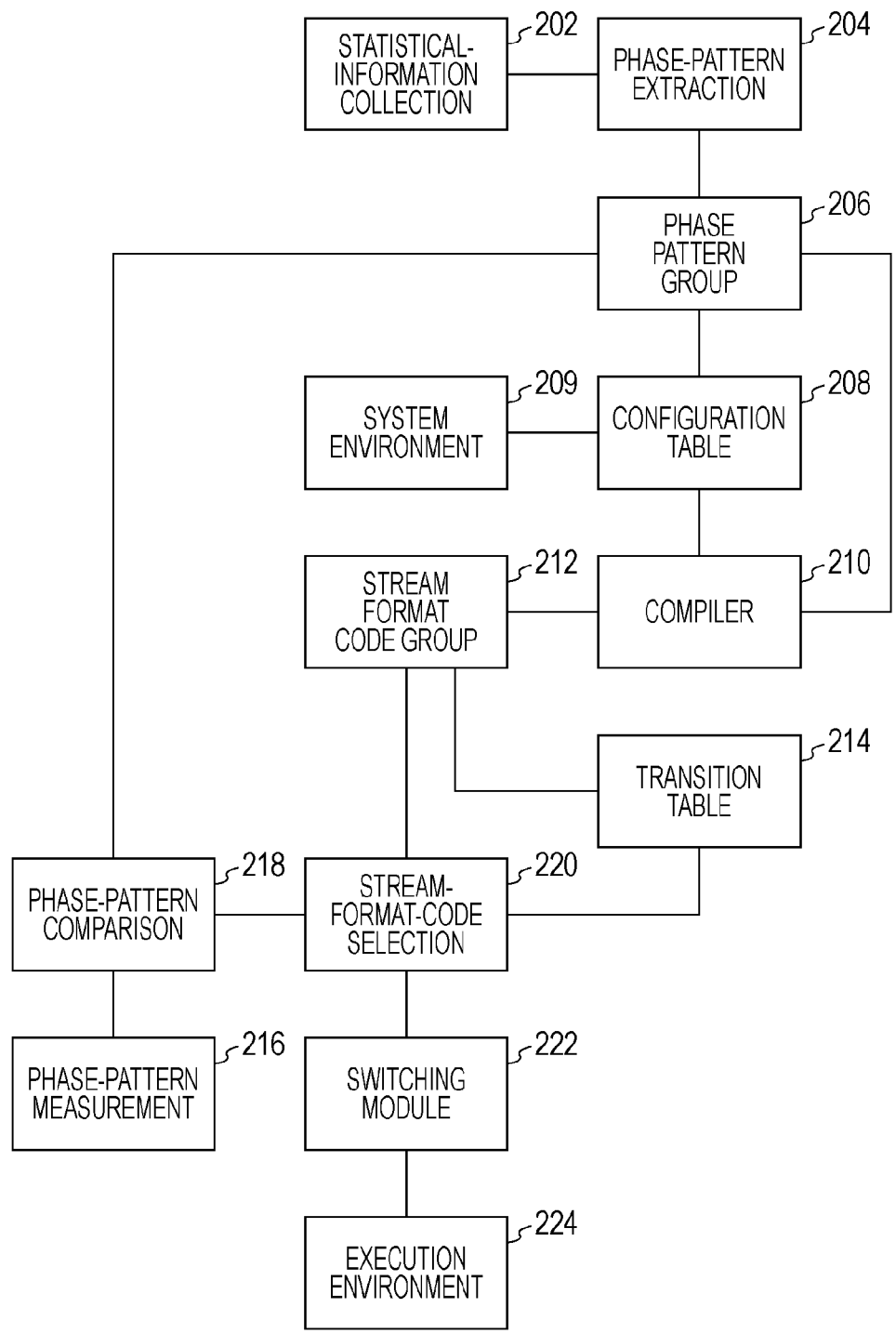
FIG. 2 is a functional block diagram for carrying out the present invention.

In FIG. 2, a statistical-information collection module 202 has the function of collecting traffic that comes to the Ethernet stack & Ethernet port 110 at certain intervals. A conventional typical method for collecting traffic uses an SNMP protocol. Alternatively, a packet analysis command called tcpdump can be used. Furthermore, a commercial tool, such as NetFlow Tracker, which can be obtained from Fluke Networks, may be used. The information collected here is the proportion of traffic, such as mail, FTP, moving picture, and web.

The statistical-information collection module 202 typically collects at least one week day's worth or one holiday's worth of traffic information and stores it in a hard disk drive or the like of a computer system (not shown).

A phase-pattern extraction module 204 analyzes the traffic information stored in the hard disk drive or the like, extracts a plurality of typical patterns, and stores them typically in the RAM 108, as a phase pattern group 206. The phase pattern group 206 can be determined by collecting traffic patterns at regular intervals or by clustering, such as k-means clustering.

Figure 6:
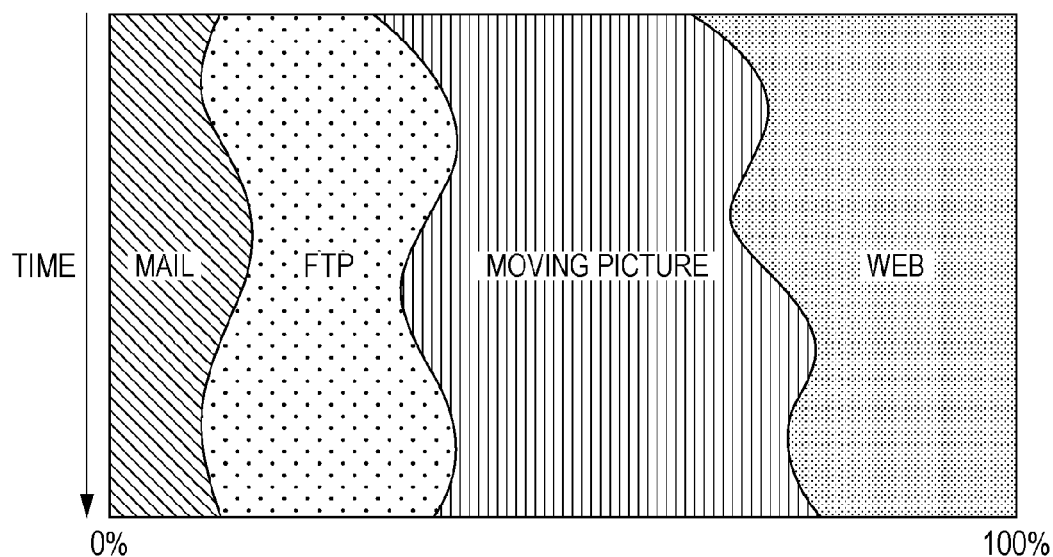
FIG. 6 is a diagram showing traffic information that changes with time.

A configuration table 208 contains entries corresponding to the individual traffic patterns of the phase pattern group 206 and is equivalent to a table in FIG. 6 described in Japanese Patent Application No. 2009-271308 filed by the applicant, and thus, it is shown again in FIG. 3.

In FIG. 3, UDOP denotes user-defined operators in stream programming; for example, an Ethernet (a trade mark) protocol stack, an IP protocol stack, a TCP protocol stack, a UDP protocol stack, an SSL protocol stack, virus scan, and an XML accelerator in this embodiment, although not limited thereto.

In FIG. 3, kernel denotes one or a plurality of modules prepared for the individual UDOPs. If there is a plurality of modules, the sizes of the one-dimensional arrays of packets differ.

Execution pattern is expressed in conformity to the following rules, for example:

Rolling loop: A+A+A . . . A=>loop(n, A)

where A+A+A . . . A denotes serial processing of A, and loop(n, A) denotes a loop in which A is rolled n times.

Unrolling loop: loop(n, A)=>A+A+A . . . A

Series rolling: split_join(A, A . . . A)=>loop(n, A)

This denotes that parallel A, A . . . A is rolled to loop(n, A).

Parallel unrolling loop: loop(n, A)=>split_joing(A, A, A . . . A)

This denotes that loop(n, A) is unrolled to parallel A, A . . . A.

Loop splitting: loop(n, A)=>loop(x, A)+loop(n−x, A)

Parallel loop splitting: loop(n, A)=>split_join(loop(x, A), loop(n−x, A))

Loop fusion: loop(n, A)+loop(n, B)=>loop(n, A+B)

Series loop fusion: split_join(loop(n, A), loop(n, B))=>loop(n, A+B)

Loop distribution: loop(n, A+B)=>loop(n, A)+loop(n, B)

Parallel Loop distribution: loop(n, A+B)=>split_join(loop(n, A), loop(n, B))

Node merging: A+B=>{A,B}

Node splitting: {A,B}=>A+B

Loop replacement: loop(n,A)=>X/*X is lower cost */

Node replacement: A=>X/*X is lower cost */

In FIG. 3, pitch indicates pipeline pitch, that is, processing time for one stage of pipeline processing. Resource indicates the number of CPUs used. In this embodiment, the number of threads in the system of FIG. 1 is described in the resource column of FIG. 3.

The entries in the configuration table 208 are created by a predetermined processing module (not shown) on the basis of a system environment 209 including hardware and software connected to the Ethernet stack & Ethernet port 110. This is achieved by executing, for all resource sets used, the process of obtaining a kernel definition for achieving each UDOP, obtaining a target hardware configuration, preparing a set of resources used by combining architectures used, selecting an executable kernel therefor, and measuring a pipeline pitch. For more details about the processing, see FIG. 3 and a corresponding description of the specification of Japanese Patent Application No. 2009-271308 filed by the applicant.

The compiler 210 creates stream format codes for the individual phase patterns of the phase pattern group 206 with reference to the entries in the configuration table 208.

Figure 4:
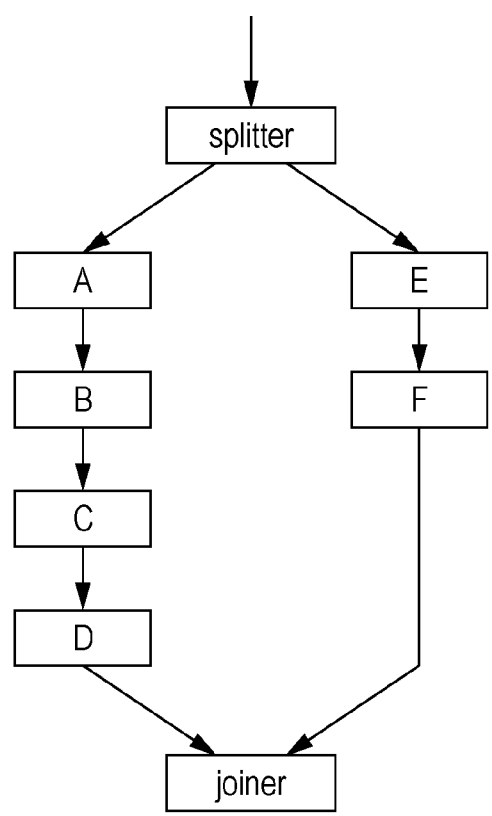
FIG. 4 is a diagram showing an example of a stream program.

Known examples of stream programming languages for describing the stream format codes include SPADE of International Business Machines Corporation and StreamIt of Massachusetts Institute of Technology. StreamIt describes the stream graph shown in FIG. 4 in the following code.

```
add splitjoin {
    split roundrobin ( ) ;
    add pipeline {
        add A ( ) ;
        add B ( ) ;
        add C ( ) ;
        add D ( ) ;
    }
    add pipeline {
        add E ( ) ;
        add F ( ) ;
    }
    join roundrobin ( ) ;
}
```

For more details about StreamIt, refer to
http://groups.csail.mit.edu/cag/streamit/
or
http://groups.csail.mit.edu/cag/streamit/papers/streamit-cookbook.pdf For SPADE, refer to
http://domino.research.ibm.com/comm/research_projects.nsf/p ages/esps.spade.html The compiler 210 creates stream format codes on the basis of the individual phase patterns. More details about the processing will be described later. The stream format code describes tasks for executing the process and hardware resources for executing the tasks in a graph format.

When the stream format codes are created for the individual phase patterns in this way, a specific processing program (not shown) creates a transition table 214 of stream format codes corresponding to the individual phase patterns. The transition table 214 may be created by the compiler 210. Hereinafter, a group of stream format codes is referred to as a stream-format code group 212.

The modules described above are for preparing the phase pattern group 206, the stream-format code group 212, and the transition table 214 in advance. Next, a module group that operates during the actual operation of the router appliance 100 will be described.

The phase-pattern measurement module 216 measures phase patterns preferably by the process of counting data items, for each kind, that the tasks at the head of the stream format codes process, which is lighter than that of the statistical-information collection module 202, during the operation of the router appliance 100. The measurement is performed, for example, at intervals suitable for the property of traffic that the router appliance 100 handles.

A phase-pattern comparison module 218 has the function of comparing the phase patterns measured by the phase-pattern measurement module 216 and the individual phase patterns of the phase pattern group 206. As the result of comparison, a stream format code corresponding to the closest phase pattern is selected from the stream-format code group 212 by a stream-format selection module 220.

The switching module 222 has the function of switching from a stream format code that has been executed by the execution environment 224 to the stream format code selected on the basis of the comparison result by the phase-pattern comparison module 218 and executing it by the execution environment 224.

At that time, according to the characteristics of the present invention, the switching module 222 reduces program stop time by setting up an appropriate alternative task when switching from the present stream format code to the next stream format code. The details of this process will be described later using a flowchart and so on.

Next, the flow of collecting statistical information and pre-processing will be described with reference to a flowchart in FIG. 5. This process is started by user operation, for example, before the router appliance 100 is operated in accordance with the functions of the present invention.

In step 502, the statistical-information collection module 202 collects traffic that comes to the Ethernet stack & Ethernet port 110 at certain intervals. The statistical-information collection module 202 uses an SNMP protocol, a packet analysis command called tcpdump, a commercial tool, such as "NetFlow Tracker", which can be obtained from Fluke Networks, or the like. The information collected here is the proportion of traffic, such as mail, FTP, moving picture, and web. The statistical-information collection module 202 typically collects at least one week day's worth or one holiday's worth of traffic information and stores it in a hard disk drive or the like of a computer system (not shown). FIG. 6 schematically illustrates a state in which traffic information changes with time. Although mail, FTP, moving picture, and web are shown here by way of example, it is to be understood that they are merely examples and various kinds of traffic are actually possible.

Figure 7:
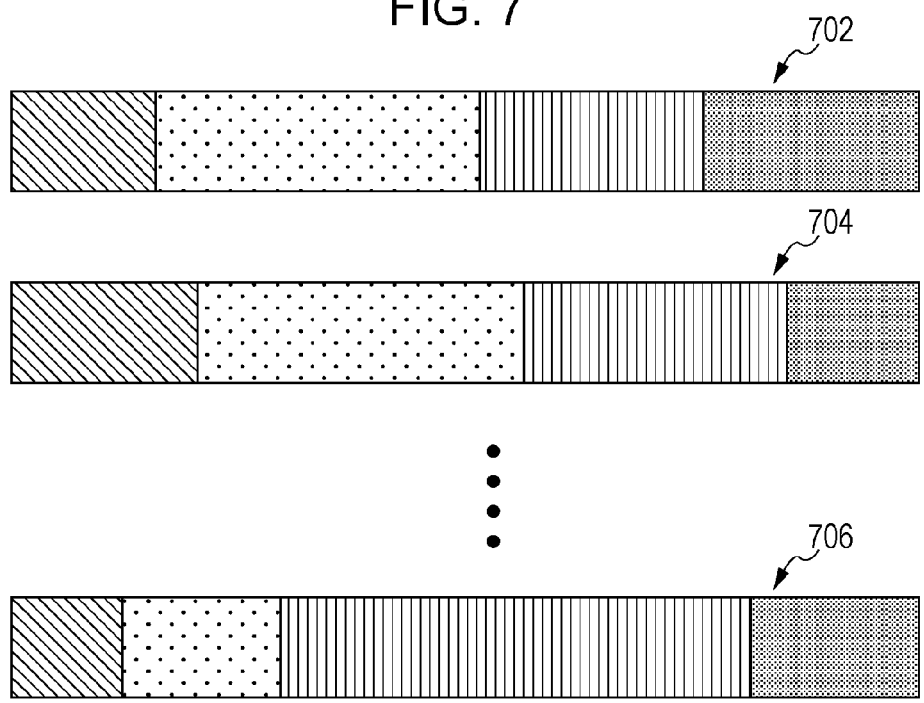
FIG. 7 is a diagram showing examples of an extracted phase.

In step 504, the phase-pattern extraction module 204 extracts a plurality of typical phase patterns 702 and 704 to 706, as shown in FIG. 7, from the traffic information collected by the statistical-information collection module 202.

The phase patterns 702 and 704 to 706 may be patterns of traffic information extracted at regular intervals or a typical one extracted from a cluster obtained by k-means clustering the patterns of traffic information extracted at regular intervals. The phase patterns (phases) 702 and 704 to 706 are stored preferably in the RAM 108 as the phase pattern group 206. The thus-created phase patterns 702 and 704 to 706 are individually given unique phase IDs.

In step 506, the compiler 210 creates stream format codes for individual phase patterns (phases) in the phase pattern group 206 with reference to the items in the configuration table 208. In other words, the compiler 210 derives resource mapping based on stream processing for each phase.

Figure 8:
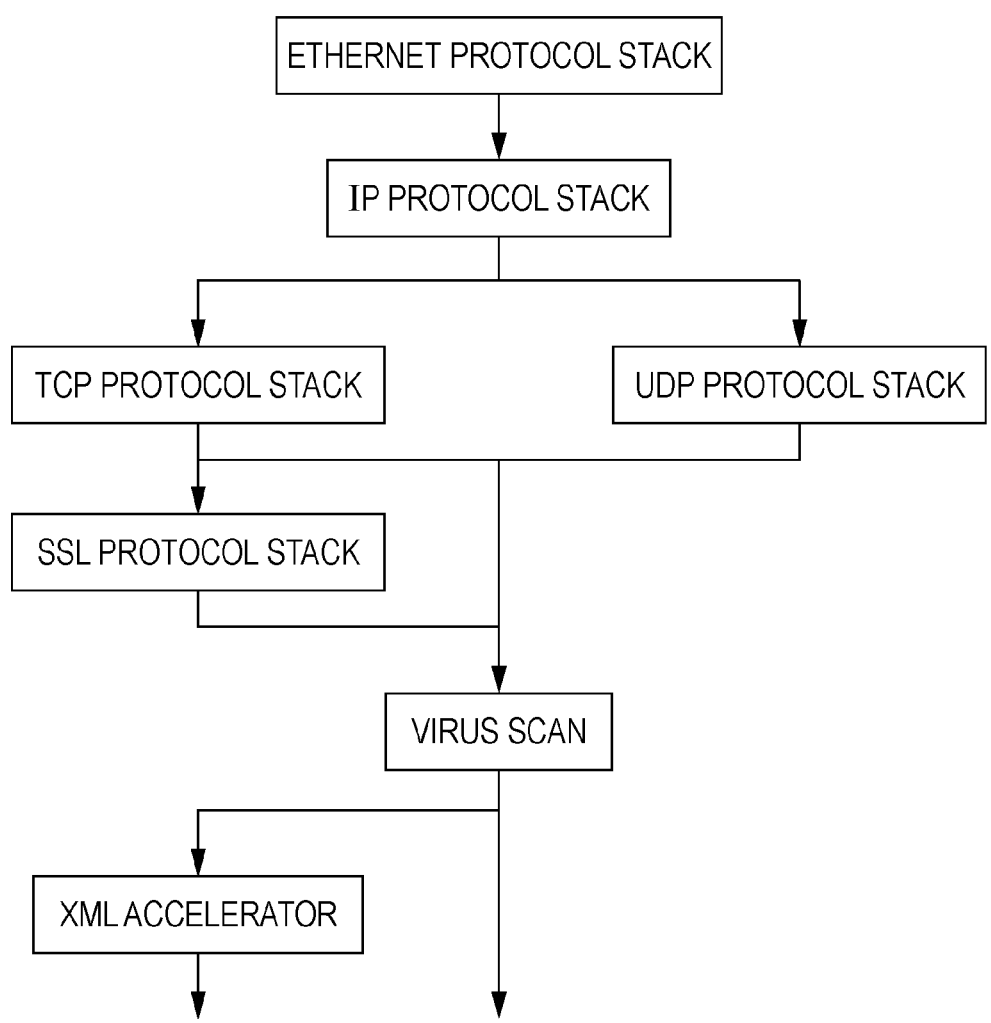
FIG. 8 is a diagram showing an example of a stream program.

FIG. 8 illustrates an example of a base stream program, in which, as shown in the drawing, an IP protocol stack is connected to an Ethernet protocol stack. The IP protocol stack forks into a TCP protocol stack and a UDP protocol stack. The TCP protocol stack and the UDP protocol stack are connected to a virus scan and also to an SSL protocol stack. The SSL protocol stack is connected to the virus scan. The virus scan is connected to an XML accelerator.

Figure 9:
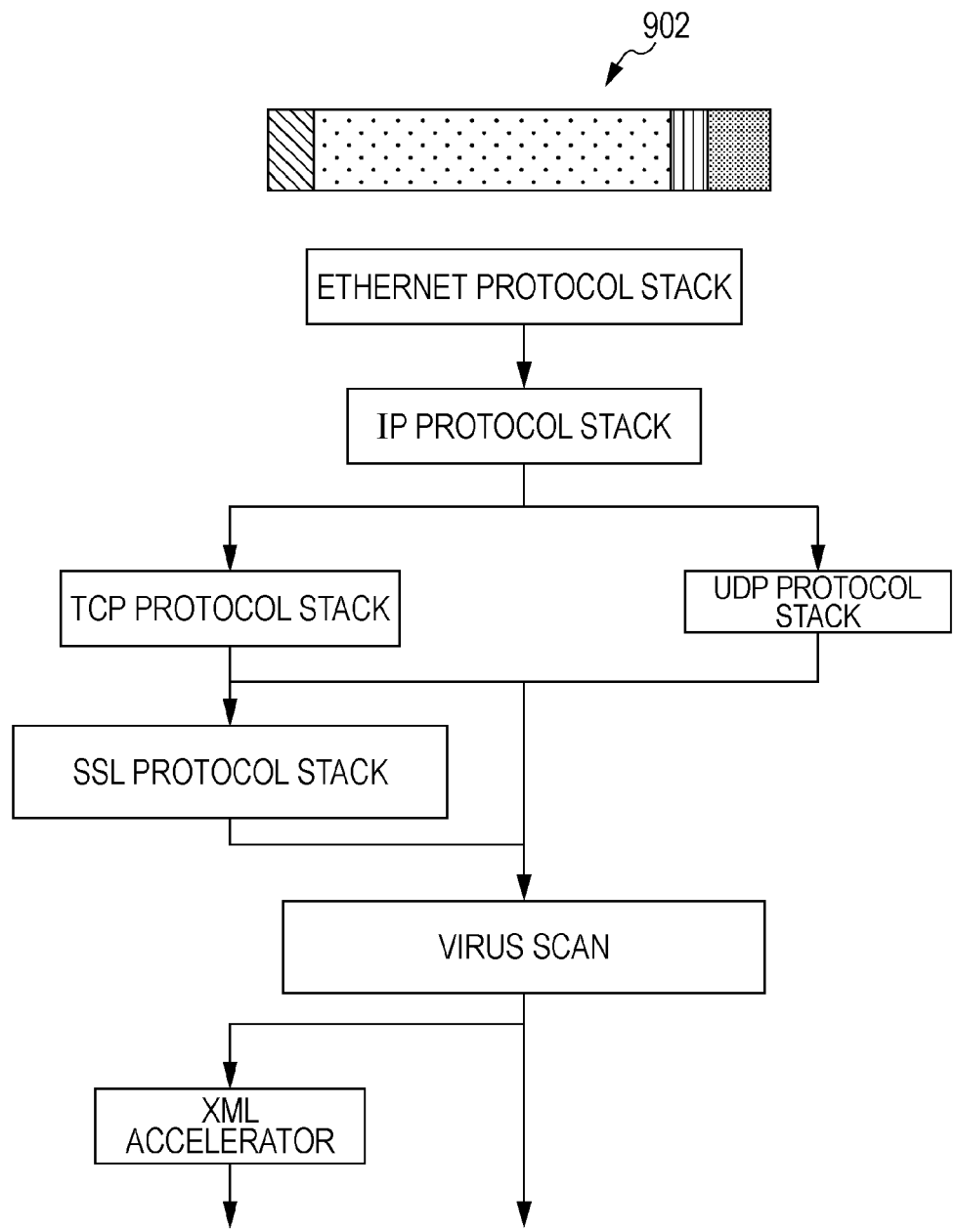
FIG. 9 is a diagram showing an example of a stream program.

Although loads on the processing elements of the stream program are not taken into account in FIG. 8, the loads on the processing elements of the stream program change with the phase of specific traffic information as in phase 902 of FIG. 9. That is, in FIG. 9, the sizes of the boxes enclosing the processing elements indicate the loads.

Figure 10:
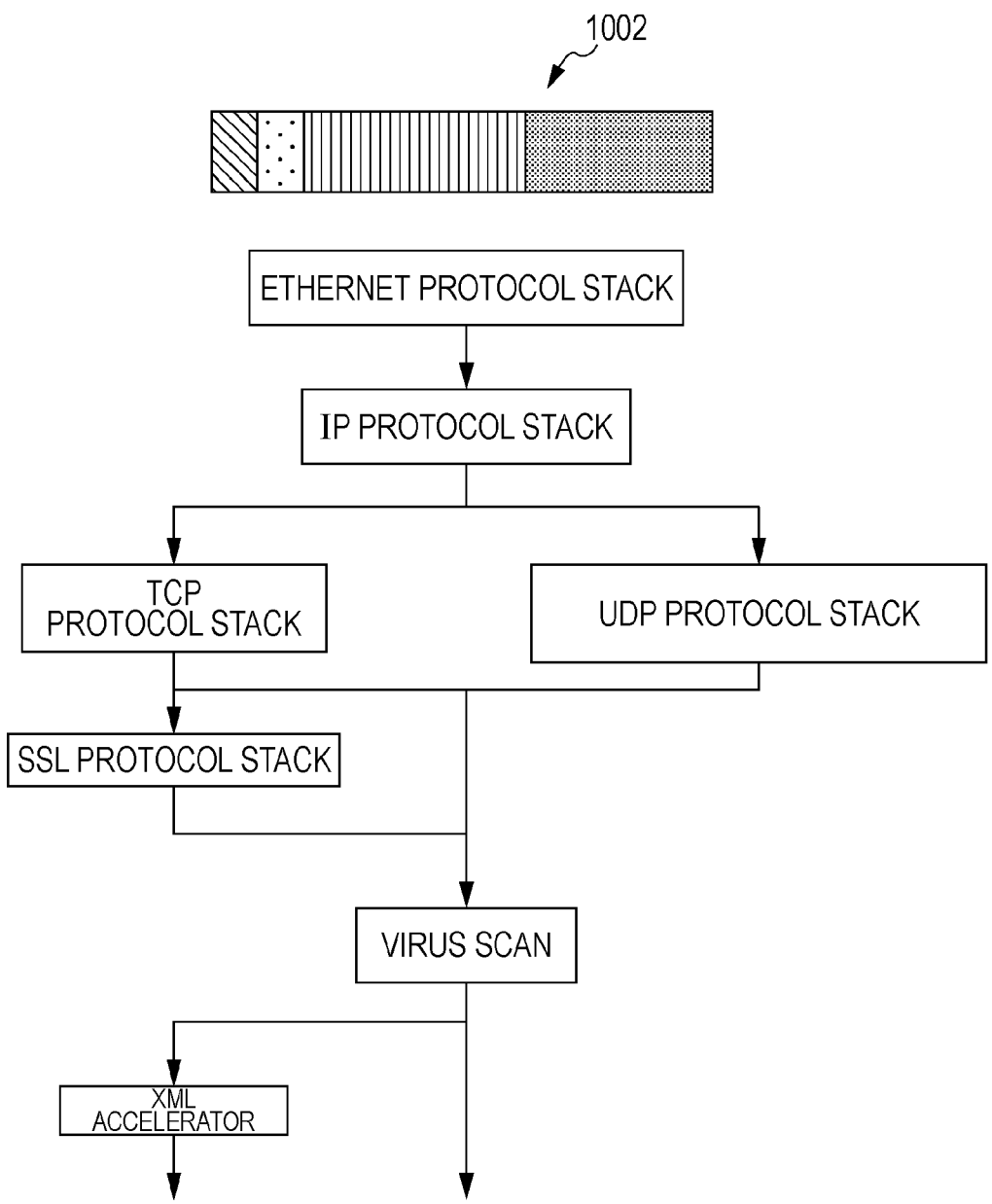
FIG. 10 is a diagram showing an example a stream program.

FIG. 10 illustrates a different distribution of loads on the processing elements in the phase 1002 of another traffic information. That is, when the phase of traffic information changes, excessive loads are exerted on specific processing elements of the stream program, which acts as a bottle neck to decrease the entire processing speed.

Thus, the process of the stream program is optimized by resource mapping. The following is a method therefor.
Parallelizing data and determining pipeline At that time, also using task parallelization offers the advantages of improving memory access locality, suppressing communication competition, and concealing communication delay.

Balancing a load per resource and the pipeline pitch by
   dividing a protocol stack that is heavy in processing into multiple stages or by integrating light protocol stacks into one stage.

The details of the process therefor will be described later because they are slightly complicated. The created stream-format code group 212 is stored preferably in the RAM 108.

In step 508, the transition table 214 of the stream format codes of the thus-created stream-format code group 212 is created. The transition table 214 contains the present tasks in stream format codes of the individual processors for each phase of the profile and alternative tasks for switching from one stream format code to another stream format code. The details of the transition table 214 will also be described later.

Next, a process for creating stream format codes will be described with reference to FIG. 11 and so on.

Figure 11:
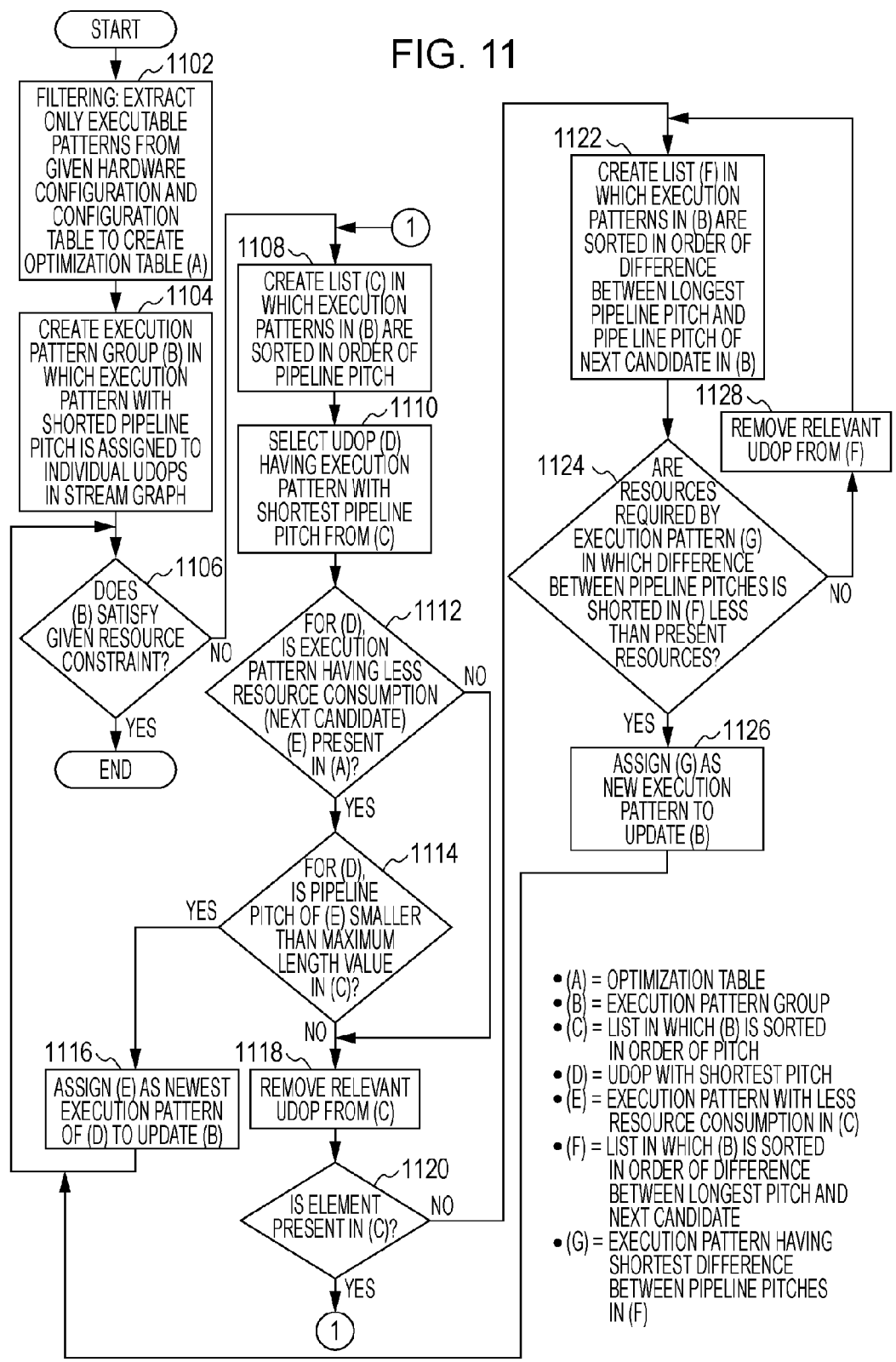
FIG. 11 is a diagram showing a flowchart for the process of assigning calculation resources to UDOPs.
Figure 12:
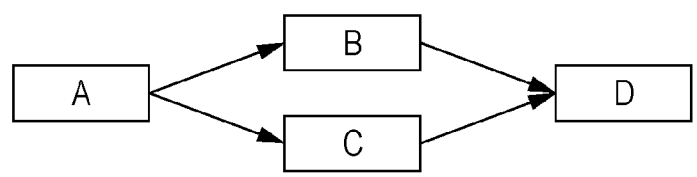
FIG. 12 is a diagram showing an example of a stream graph and available resources.

In FIG. 11, the system environment 209, that is, resource constraint (hardware configuration), and the configuration table 208 are prepared in advance. An example of a stream graph including functional blocks A, B, C, and D and resource constraint is shown in FIG. 12. The system environment 209 here indicates a system configuration connected to the Ethernet stack & Ethernet port 110 in FIG. 1.

The compiler 210 performs filtering in step 1102. That is, the compiler 210 extracts only executable patterns from the given hardware configuration and configuration table 208 to create an optimization table (A).

Figure 13:
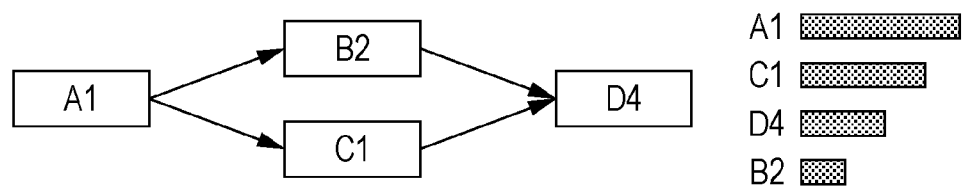
FIG. 13 is a diagram showing an example of requested resources after calculation resources are assigned to UDOPs.

In step 1104, the compiler 210 creates an execution pattern group (B) in which an execution pattern with the shorted pipeline pitch is assigned to individual UDOPs in the stream graph with reference to the optimization table (A). An example in which the execution patterns are assigned to the individual blocks of the stream graph is shown in FIG. 13.

Next, in step 1106, the compiler 210 determines whether the execution pattern group (B) satisfies given resource constraint.

In step 1106, if the compiler 210 determines that the execution pattern group (B) satisfies the given resource constraint, this process is completed.

In step 1106, if the compiler 210 determines that the execution pattern group (B) does not satisfy the given resource constraint, then the process moves to step 1108, in which it creates a list (C) in which the execution patterns in the execution pattern group (B) are sorted in the order of pipeline pitch.

Next, the process moves to step 1110, in which the compiler 210 selects a UDOP (D) having an execution pattern with the shortest pipeline pitch from the list (C).

Next, the process moves to step 1112, in which the compiler 210 determines, for the UDOP(D), whether an execution pattern having less resource consumption (next candidate) (E) is present in the optimization table (A).

If a positive determination is made, then the process moves to step 1114, in which the compiler 210 determines, for the UDOP(D), whether the pipeline pitch of the execution pattern (next candidate) (E) is smaller than the maximum length value in the list (C).

If a positive determination is made, then the process moves to step 1116, in which the compiler 210 assigns the execution pattern (next candidate) (E) as a new execution pattern of the UDOP(D) to update the execution pattern group (B).

The process returns from step 1116 to the determination in step 1106.

If the determination in step 1112 is negative, then the process moves to step 1118, in which the compiler 210 removes the relevant UDOP from the list (C).

Next, the process moves to step 1120, in which the compiler 210 determines whether an element is present in the list (C). If a positive determination is made, then the process returns to step 1108.

In step 1120, if it is determined that no element is present in the list (C), then the process moves to step 1122, in which the compiler 210 creates a list (F) in which the execution patterns in the execution pattern group (B) are sorted in the order of the difference between the longest pipeline pitch of the execution pattern group (B) and the pipeline pitch of the next candidate.

Next, in step 1124, the compiler 210 determines whether resources required by an execution pattern (G) in which the difference between pipeline pitches is shortest in the list (F) are less than focused present resources.

If a positive determination is made, then the process moves to step 1126, in which the compiler 210 assigns the execution pattern (G) as a new execution pattern to update the execution pattern group (B) and moves to step 1106. If a negative determination is made, then the compiler 210 removes the relevant UDOP from the list (F) in step 1128 and returns to step 1122.

Figure 14:
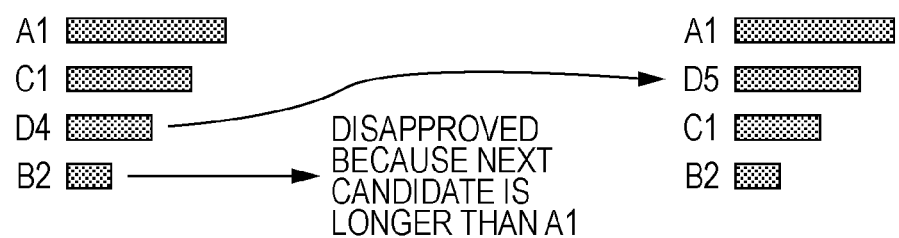
FIG. 14 is a diagram showing an example of an assignment change process.

FIG. 14 is a diagram showing an example of such optimization by replacement of the execution pattern group. In FIG. 14, D4 is replaced with D5 to lift the resource constraint.

After the resource assignment is performed, in this way, the individual stream format codes are stored preferably in the RAM 108 as the stream-format code group 212. The individual tasks with the stream format codes are given unique task IDs.

Next, the process of selecting alternative tasks when switching between phases will be described with reference to a flowchart in FIG. 15. The process is executed by a predetermined thread running in the processor 104 or 106.

Before description of the flowchart in FIG. 15, the definitions of signs or mathematical expressions used below will be described.

Definition task(b,r): task of resource r in phase b
Pre(t): a set of preceding tasks of task t
Post(t): a set of subsequent tasks of task t
*1: task-t start time in phase b
start(b,t)=max{start(b,p):p∈Pre(t)}+pitch
pitch: pipeline pitch (task execution time)
*2: cost(t,r)=D+C+T
D=max{0,start(a,task(a,r))−start(b,task(t))}
where D is a cost including an idle time until the start of execution of an alternative task.
C=max{delay(i,r),delay(r,j):i∈Deputize(a,b,s),s∈Pre(t), j∈Resource (b,u),u∈Post(t)}
Resource(b,t): a set of resources in charge of task t in phase b
Deputize(a,b,t): a set of resources that acts for task t when phase a is switched to phase b
delay(a,b): the time after resource a starts data transmission until resource b completes data reception
T=change(task(a,r),t)+change(t,task(b,r))
change(t1,t2): 0 if task t1 is the same as time t2, and if not so, TC (the cost of one task switching, any constant)

Figure 15:
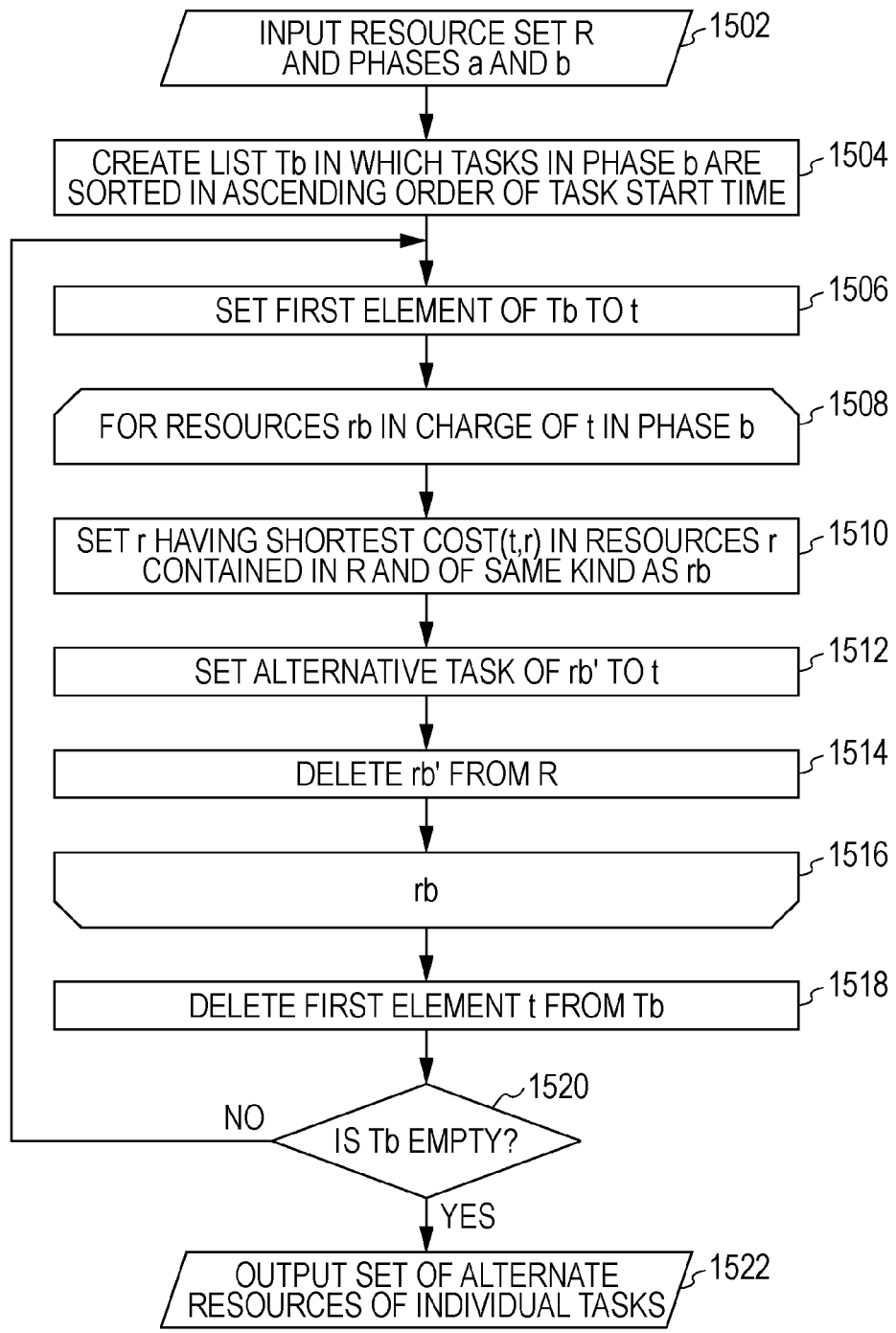
FIG. 15 is a diagram showing a flowchart of a process for determining alternative resources of tasks.

Referring back to the flowchart in FIG. 15, in step 1502, a set of resources, R, and phases a and b are input. At that time, the set of resources, R, includes resource IDs and communication delays among the resources. The phases a and b include task IDs, resource IDs in charge of the individual tasks, sets of preceding and subsequent tasks of the individual tasks, and task execution times. This corresponds to step 508 in FIG. 5.

In step 1504, a list Tb is created in which tasks in phase b (more strictly, tasks in a stream graph corresponding to phase b) are sorted in ascending order of task start time). The task start time is defined by *1 described above.

In step 1506, the first task is set to t.

Next, step 1508, step 1510, step 1512, step 1514, and step 1516 are processes for resources rb in charge of t in phase b.

In step 1510, resource r having the smallest cost(t,r) among resources r contained in R and of the same kind as rb is set to rb'. The kind of resource indicates a general purpose processor, an accelerator which is a graphic processing unit, and so on. Cost(t,r) is defined by *2 described above.

In step 1512, the alternative task of rb' is set to t. Next, in step 1514, rb' is deleted from R.

Thus, the process returns to step 1508, and step 1510, step 1512, step 1514, and step 1516 are repeated as long as resource rb in charge of t in phase b is present.

In step 1518, the first element t is deleted from Tb, and in step 1520, it is determined whether Tb is empty. If a negative determination is made, the process returns to step 1506. The first element in step 1506 refers to the next element after the first element t is deleted from Tb in step 1518.

If it is determined in step 1520 that Tb is empty, a set of alternative resources of the individual tasks is obtained. That is, since alternative tasks t of the resources rb' are determined in step 1512, a set of such tasks (rb',t) can be obtained {step 1522).

Figure 16:
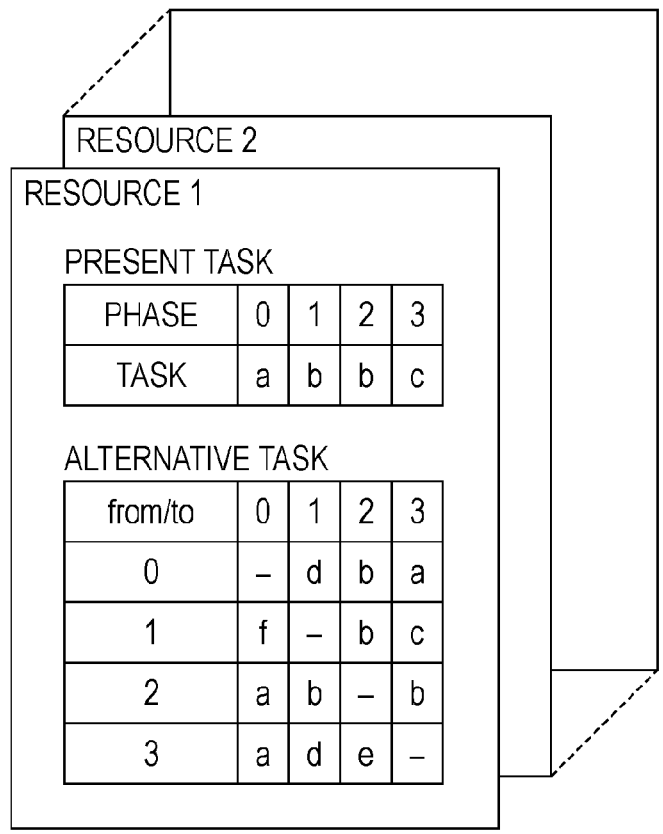
FIG. 16 is a diagram showing tables of the present tasks for the individual resources and alternative tasks.

The process in the flowchart of FIG. 15 is performed on all combinations of different phases a and b. As a result, as shown in FIG. 16, a correlation table of phase IDs and present task IDs and a correlation table of phase IDs and alternative task IDs are created for all available resources connected to the router appliance 100. The correlation tables of phase IDs and alternative task IDs are presented as two-dimensional tables for expressing two-way transition. These correlation tables are shown as the transition table 214 in FIG. 2.

Figure 5:
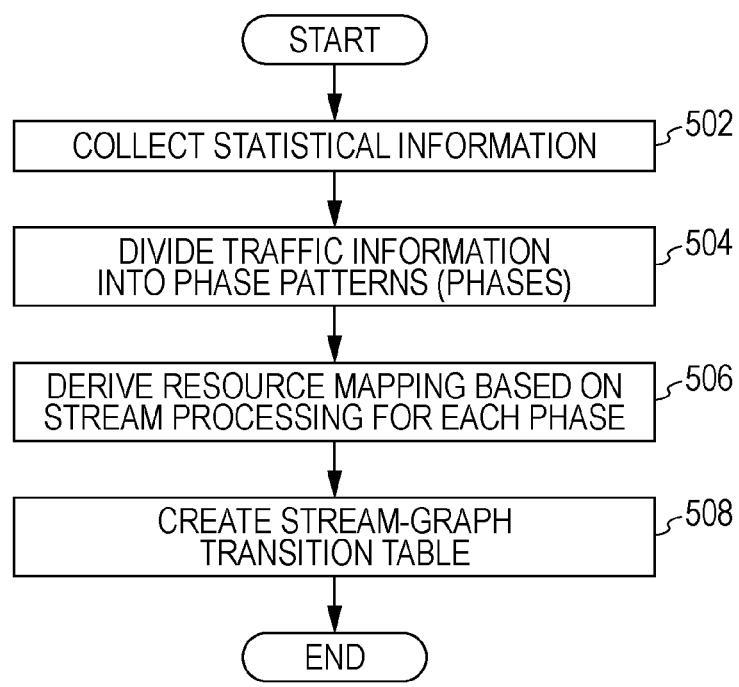
FIG. 5 is a flowchart for preprocessing.

That is, the correlation tables of phase IDs and present task IDs are created in step 506 of FIG. 5, and the correlation tables of phase IDs and alternative task IDs are created in step 508 of FIG. 5.

Programs executed on the individual resources can be switched by preparing a wrapper that switches between functions to be called on the basis of task ID.

Although the tables described above are general-task tables, a monitoring task table may also be provided. This holds threshold values for use in determination of phase switching, which are sets of times and phase IDs for switching on a time zone basis, and sets of the centers of gravity and phase IDs for k-means clustering.

Figure 17:
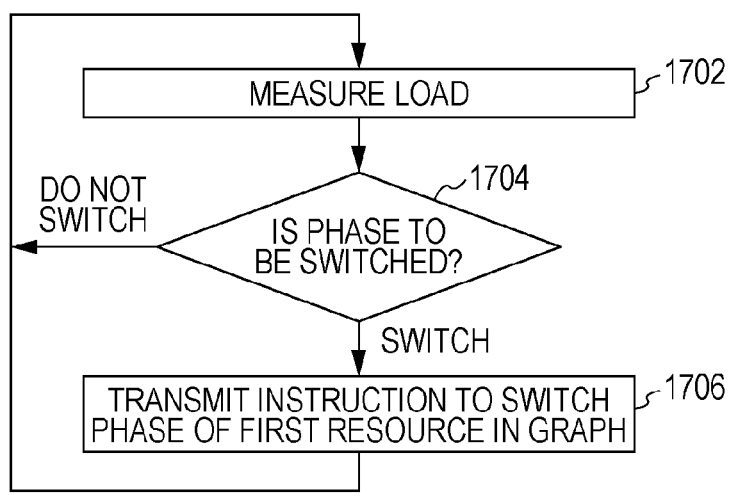
FIG. 17 is a diagram showing a flowchart of a process for determining phase shift.

FIG. 17 is a flowchart showing the operations of the phase-pattern measurement module 216 and the phase-pattern comparison module 218 after the stream-format code group 212 and the transition tables 214 are prepared.

In FIG. 17, step 1702, the phase-pattern measurement module 216 measures the loads, that is, collects traffic that has come to the Ethernet stack & Ethernet port 110. The phase-pattern comparison module 218 determines in step 1704 whether to switch between the phases by calculating the distance between the phase of the measured traffic and a phase that is selected at present. That is, if the distance is within a predetermined threshold value, then the phase-pattern comparison module 218 determines not to switch the phase and returns to step 1702. If the distance is greater than or equal to the predetermined threshold value, the phase-pattern comparison module 218 determines to switch the phase and moves to step 1706.

As shown in FIG. 7, the phase can be regarded as a feature vector having the proportion of traffic, that is, mail, FTP, moving picture, and web, and thus, such values as Euclid distance, Manhattan distance, and inner product, can be defined among the feature vectors. Thus, it should be determined whether such an inner product or distance is within a threshold value.

In step 1706, the phase-pattern comparison module 218 transmits an instruction to switch the phase of the first resource in the graph to the stream-format selection module 220. Then, the process returns to step 1702.

Figure 18:
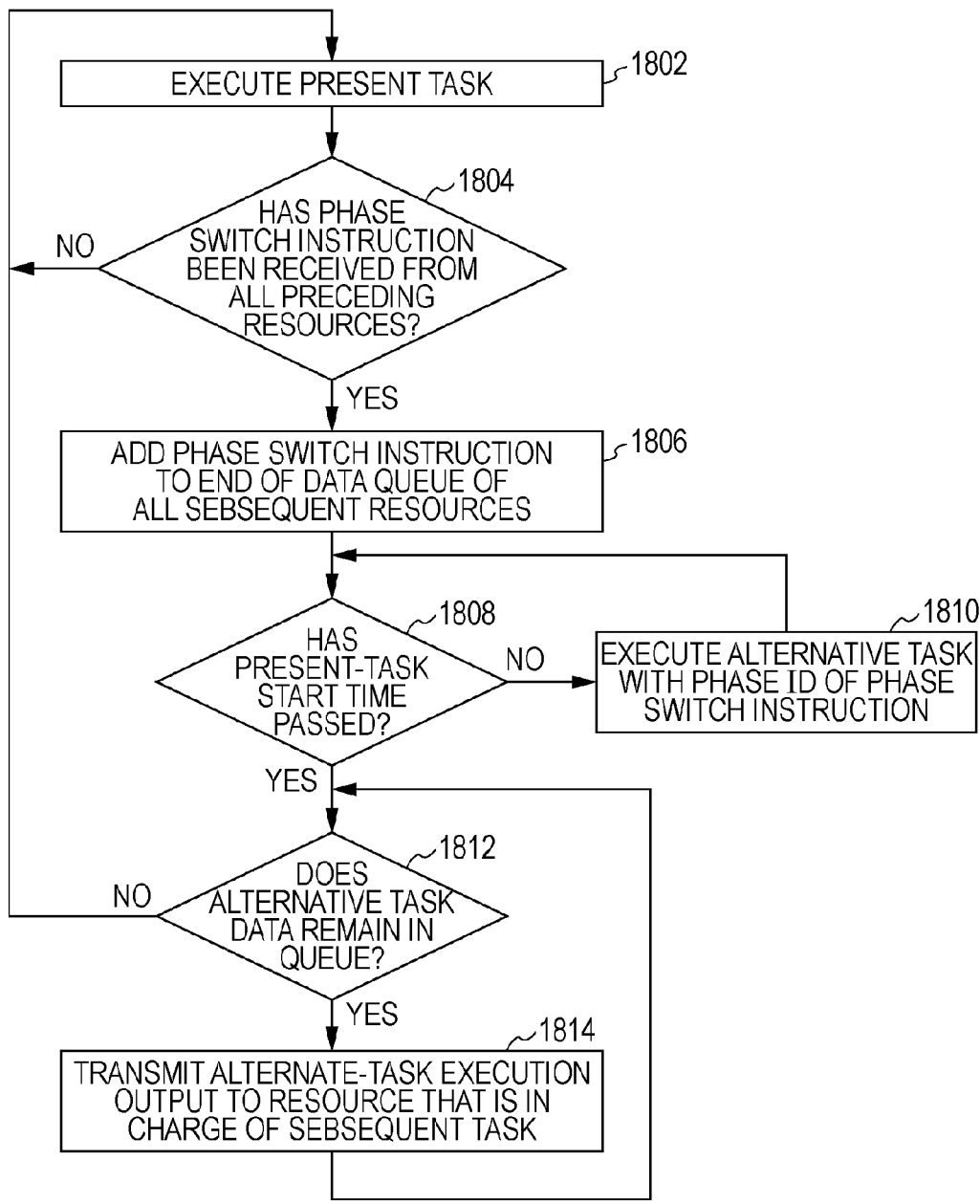
FIG. 18 is a diagram showing a flowchart for an execution process by alternative tasks.

FIG. 18 is a diagram showing a flowchart for the operations of the stream-format selection module 220, the switching module 222, and the execution environment 224.

In step 1802, the execution environment 224 executes the present task in a currently selected stream format code. In step 1804, the switching module 222 determines whether a phase switch instruction been received from all preceding resources. If a negative determination is made, then the process returns to step 1802, in which the execution environment 224 continue to execute the present task.

In step 1804, if the switching module 222 receives a phase switch instruction from all the preceding resources, the process moves to step 1806, in which a stream format code that has already been selected by a monitoring task is set to a subsequent stream format code.

Since the ID of the subsequent stream format code is included in the phase switch instruction, the switching module 222 adds the phase switch instruction to the end of the data queue of all the subsequent resources in step 1806.

Next, the process moves to step 1808, in which the switching module 222 determines whether the time to start the present task with the subsequent stream format code has passed. If a negative determination is made, in step 1810, the execution environment 224 executes an alternative task in the phase ID of the phase switch instruction and returns to step 1808. The alternative task can be determined from the immediately preceding phase ID and the present phase ID of the active resource, as shown in FIG. 16.

In step 1808, if the switching module 222 determines that the time to start the present task with the subsequent stream format code has passed, then the process moves to step 1812.

In step 1812, the switching module 222 determines whether data of the alternative task remains in the queue. If a negative determination is made, then the process returns to the execution of the present task in step 1802.

In step 1812, if the switching module 222 determines that the data of the alternative task remains in the queue, then the process moves to step 1814, in which the switching module 222 makes the execution environment 224 execute the alternative task and transmits the output to a resource that is to execute the subsequent task.

Figure 19:
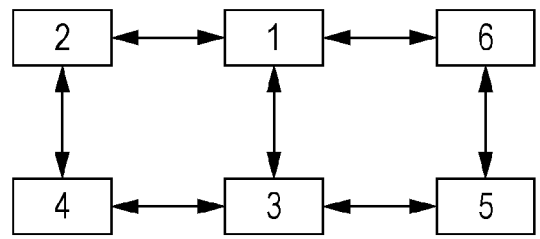
FIG. 19 is a diagram showing an example of the topology of a calculation resource.

The phase switching operation using the alternative task will be described more concretely herein using a schematic example. First, FIG. 19 is the topology of a calculation resource connected to the Ethernet stack & Ethernet port 110 of the router appliance 100. This cannot be dynamically reconfigured because it is a physical topology and is not software.

FIG. 20 shows reduction of a system stop time due to phase switching of the calculation resource with the physical topology composed of resources 1 to 6 by passing a state, as shown in FIG. 20(2), in which alternative tasks are used when shifting from a state, as shown in FIG. 20(1), in which the resources are assigned in a stream format in phase a to a state, as shown in FIG. 20(3), in which the resources are assigned in a stream format in phase β.

That is, to shift from the state in phase α in FIG. 20(1) in which the resource 1 executes task a, the resource 2 executes task c, the resource 3 executes task d, the resource 4 executes task e, the resource 5 executes task f, and the resource 6 executes task b to the state in phase β in FIG. 20(3) in which the resource 1 executes task A, the resource 2 executes task B, the resource 3 executes task C, the resource 4 executes task E, the resource 5 executes task D, and the resource 6 executes task F, the resource 3 executes task D and transmits it to the resource 5 in FIG. 20(2), as in step 1810; the resource 3 executes task D and transmits it to the resource 6 as in step 1814; and next in FIG. 20(3), the resource 3 executes task C and transmits it to the resource 5, as in step 1802. Likewise, the resource 6 also executes task C alternatively and transmits it to the resources 4 and 3 in FIG. 20(2).

FIG. 21 is a diagram showing an execution task transition cycle. In the drawing, execution of task C by the resource 6 and execution of task D by the resource 3 are execution as alternative tasks.

That is, since the individual phases are pipelined, the tasks are completed from the first task. Thus, according to the basic scheme of the present invention, resources that have completed phase a earlier act for the first resources in phase β, and after all the resources have completed tasks in phase α, intended tasks are started.

Although the present invention has been described as related to a specific embodiment, it is to be understood that the illustrated hardware, software, and network configuration are merely examples and that the present invention can be achieved by any configuration equivalent thereto in terms of function.

REFERENCE SIGNS LIST

100: router appliance
102: bus
104: multicore processor
106: multicore processor
108: RAM
110: Ethernet port
112: flash ROM
202: statistical-information collection module
204: phase-pattern extraction module
206: phase pattern group
208: configuration table
209: system environment
210: compiler
212: stream-format code group
214: transition table
216: phase-pattern measurement module
218: phase-pattern comparison module
220: stream-format selection module
222: switching module
224: execution environment
702: phase pattern
704: phase pattern
706: phase pattern

The invention claimed is:

1. A computer system for dynamically changing a configuration of the system by computer processing so as to be adapted for content of network traffic information, the system comprising:
   means for storing in advance, in a storage means, a plurality of stream-format resource assignments that indicate tasks and assignment of resources with which the tasks are executed in a stream format to be adapted for phase patterns corresponding to a plurality of different contents of the network traffic information, each of said stream-format resource assignments comprising a phase pattern;
   means for measuring the network traffic information during the current phase;
   means for selecting a stream-format resource assignment from the plurality of stored stream-format resource assignments, with a phase pattern that is closest to the measured network traffic information as a next phase; and means for switching, using a processor, from the plurality of stored stream-format resource assignments, a stream-format resource assignment in the selected present phase to a stream-format resource assignment in the next phase, wherein the switching comprises:

initiating a switch from the stream-format resource assignment in the selected present phase to the stream-format resource assignment in the next phase;

each resource processes queued tasks of the selected present phase until no tasks of the present phase remain in the resource queue;

at least one resource processes at least one alternative task of the next phase; and each resource processes tasks in stream-format resource assignment in the next phase after completing any alternative tasks in the resource queue.

2. The system according to claim 1, further comprising means for calculating alternative tasks in phase shift for the individual available resources and storing the alternative tasks as a table, wherein the switching means finds the alternative tasks stored in correspondence with the resources from the present phase and the next phase and executes the alternative tasks alternatively.

3. The system according to claim 2, wherein the alternative tasks in phase shift are selected to reduce a related-task switching cost, a cost including an idle time until the alternative-task execution is started, a cost including the time for data transmission and reception between the resources in the related phases.

4. The system according to claim 1, wherein the alternative tasks are selected by measuring and storing pipeline pitches of related tasks, a related-task switching cost, and a cost including the time for data transmission and reception between resources in related phases.

5. The system according to claim 1, wherein the storage means includes a transition table of stream-format codes, the transition table including present tasks in stream-format codes of individual processors for each phase and alternative tasks for switching from one stream-format code to another stream-format code.

6. A computer system for dynamically changing a configuration of the system by computer processing so as to be adapted for content of network traffic information, the system comprising:

a storage device configured to store, in advance, a plurality of stream-format resource assignments that specifies tasks and assignment of resources with which the tasks are executed in a stream format to be adapted for phase patterns corresponding to a plurality of different contents of the network traffic information, wherein each of said stream-format resource assignments comprise a phase pattern;

a measuring mechanism configured to measure the network traffic information;

a selection device configured to select a stream-format resource assignment from the plurality of stored stream-format resource assignments, with a phase pattern that is closest to measured network traffic information as a next phase;

a calculation device for calculating a distance between a phase of the current network traffic and a phase of a present stream-format resource assignment; and a switch configured for switching, using a processor, based on a calculated distance exceeding a predetermined threshold, from the stream-format resource assignment in the selected present phase to stream-format resource assignment in the next phase, wherein the switching comprises:

initiating a switch from the stream-format resource assignment in the selected present phase to the stream-format resource assignment in the next phase;

each resource processes queued tasks of the selected present phase until no tasks of the present phase remain in the resource queue;

at least one resource processes at least one alternative task of the next phase; and each resource processes tasks in stream-format resource assignment in the next phase after completing any alternative tasks in the resource queue.

7. The system according to claim 6, further comprising a module for calculating alternative tasks in phase shift for the individual available resources and storing the alternative tasks as a table, wherein the switch finds the alternative tasks stored in correspondence with the resources from the present phase and the next phase and executes the alternative tasks alternatively.

8. The system according to claim 7, wherein the alternative tasks in phase shift are selected to reduce a related-task switching cost, a cost including an idle time until the alternative-task execution is started, a cost including the time for data transmission and reception between the resources in the related phases.

9. The system according to claim 6, wherein the alternative tasks are selected by measuring and storing pipeline pitches of related tasks, a related-task switching cost, and a cost including the time for data transmission and reception between resources in related phases to reduce costs.

10. The system according to claim 6, wherein the information stored in the storage device includes a transition table of stream-format codes, the transition table including present tasks in stream-format codes of individual processors for each phase and alternative tasks for switching from one stream-format code to another stream-format code.

11. A non-transitory computer readable storage medium comprising a computer system control program product for dynamically changing the configuration of the system by computer processing to be suitable for content of network traffic information, wherein the computer readable program product when executed by a processor on a computer causes the computer to perform the steps of the program product, comprising:

computer usable program code for storing, in advance, in the storage medium, a plurality of stream-format resource assignments that indicate tasks and assignment of resources with which the tasks are executed in a stream format to be adapted for phase patterns corresponding to a plurality of different contents of the network traffic information, each of said stream-format resource assignments comprising a phase pattern;

computer usable program code for measuring the network traffic information;

computer usable program code for selecting a stream-format resource assignment from the plurality of stored stream-format resource assignments, with a phase pattern that is closest to the measured network traffic information as a next phase; and computer usable program code for switching from the stream-format resource assignment in the selected present phase to stream-format resource assignment in the next phase, wherein the switching comprises:
- initiating a switch from the stream-format resource assignment in the selected present phase to the stream-format resource assignment in the next phase;
- each resource processes queued tasks of the selected present phase until no tasks of the present phase remain in the resource queue;
- at least one resource processes at least one alternative task of the next phase; and
- each resource processes tasks in stream-format resource assignment in the next phase after completing any alternative tasks in the resource queue.

12. The non-transitory computer readable storage medium according to claim 11, further comprising computer usable program code for calculating alternative tasks in phase shift for the individual available resources and storing the alternative tasks as a table, wherein, in the switching, the alternative tasks stored in correspondence with the resources are found from the present phase and the next phase and are executed alternatively.

13. The non-transitory computer readable storage medium according to claim 12, wherein the alternative tasks in phase shift are selected to reduce a related-task switching cost, a cost including an idle time until the alternative-task execution is started, a cost including the time for data transmission and reception between the resources in the related phases.

14. The non-transitory computer readable storage medium according to claim 12, wherein the alternative tasks are selected by measuring and storing pipeline pitches of related tasks, a related-task switching cost, and a cost including the time for data transmission and reception between resources in related phases to reduce costs.

15. The non-transitory computer readable storage medium according to claim 12, wherein the information stored in the computer usable program code includes a transition table of stream-format codes, the transition table including present tasks in stream-format codes of individual processors for each phase and alternative tasks for switching from one stream-format code to another stream-format code.

* * * * *